US006198490B1

(12) United States Patent
Eom et al.

(10) Patent No.: US 6,198,490 B1
(45) Date of Patent: Mar. 6, 2001

(54) PRINTER AND METHOD OF CORRECTING COLOR REGISTRATION ERROR THEREOF

(75) Inventors: Yoon-seop Eom, Suwon; Seung-deog An, Yongin; Nam-ryoung Kim; Sang-shin Park, both of Suwon; Beom-ro Lee, Seoul, all of (KR)

(73) Assignee: Samsung Electronics Co., Ltd., Kyungk-do (KR)

( * ) Notice: Subject to any disclaimer, the term of this patent is extended or adjusted under 35 U.S.C. 154(b) by 0 days.

(21) Appl. No.: 09/430,122

(22) Filed: Oct. 29, 1999

(30) Foreign Application Priority Data

Oct. 29, 1998 (KR) .................................................. 98-45724

(51) Int. Cl.$^7$ ..................................................... G03G 15/01
(52) U.S. Cl. ........................................... 347/116; 399/301
(58) Field of Search ..................................... 347/116, 117, 347/118, 232, 233, 234; 399/301

(56) References Cited

U.S. PATENT DOCUMENTS

| 5,115,256 | * | 5/1992 | Miyagi et al. | 347/116 X |
| 5,257,037 | * | 10/1993 | Haneda et al. | 347/116 X |
| 5,909,235 | * | 6/1999 | Folkins | 347/240 |

FOREIGN PATENT DOCUMENTS

| 8-324028 | 12/1996 | (JP) | B41J/2/525 |
| 11-237778 | 8/1999 | (JP) | G03G/15/01 |

* cited by examiner

Primary Examiner—Joan Pendegrass
(74) Attorney, Agent, or Firm—Sughrue, Mion, Zinn, Macpeak & Seas, PLLC

(57) ABSTRACT

A color printer capable of detecting and correcting color registration error. The printer includes a photoreceptor belt circulating along a path formed by a plurality of rollers; a plurality of optical scanning devices for scanning light toward the photoreceptor belt; a plurality of developing devices for supplying developing materials of different colors to the photoreceptor belt; a plurality of detectors for detecting part of light emitted from the optical scanning devices; an engine controller for controlling the driving of the optical scanning devices, the developing devices, and the rollers, based on received light output from the optical detectors, so that test patterns for each optical scanning device set to detect the color registration error between the optical scanning devices can be formed on the photoreceptor belt; a pattern position detector for detecting the positions of the test patterns formed from fixed positions through a developing process; and a color registration correction calculator for calculating a color registration error amount from the position information of the test patterns provided by the pattern position detector, and calculating color registration correction data from the calculated error amount and outputting the calculated correction data to the engine controller. In color registration error correction using the printer, the positions of electrostatic latent images, corresponding to test patterns formed on a photoreceptor belt by optical scanning devices, are detected by developing the electrostatic latent images with a single color. Therefore, a structure for measuring error amounts from the test patterns is simple, and the accuracy of measurement can be improved.

14 Claims, 16 Drawing Sheets

PRINTER AND METHOD OF CORRECTING COLOR REGISTRATION ERROR THEREOF

BACKGROUND OF THE INVENTION

1. Field of the Invention

The present invention relates to a printer designed to be able to correct registration of images of different colors rendered at wrong areas, and a method of correcting a color registration error.

2. Description of the Related Art

FIG. 1 illustrates a cross-sectional view of a general liquid electrophotographic color printer. The printer operates by transporting developer by photoreceptor belt 14 onto paper 23 passing through a transfer device 20.

Photoreceptor belt 14 follows a circulation path around a plurality of rollers 11, 12 and 13. Installed around the circulation path are a reset device 15, optical scanning devices 30, 40, 50, 60, optical detectors 38, 48, 58 and 68, developing devices 36, 46, 56 and 66, a drying device 18, and the transfer device 20.

Chargers 15b, 37, 47, and 57 charge the photoreceptor belt 14 with a predetermined potential to prime the belt for the registration of a new electrostatic latent image. Yellow, magenta, cyan, and black each require the registration of a new electrostatic latent image. After transfer of the color images onto paper, an exposing device 15a erases any remaining electrostatic charge from the photoreceptor belt 14.

The printing process begins when the leading edge of a designated image writing page area on the photoreceptor belt 14 reaches the scanning position of the first optical scanning device 30. The first optical scanning device 30 projects light corresponding to yellow-color image information onto the photoreceptor belt 14, which already carries a charge from charger 15b. An electrostatic latent image is formed on the photoreceptor belt 14 by the first optical scanning device 30, and is developed by the first developing device 36, which supplies yellow developer (Y).

The page area on the photoreceptor belt 14 is recharged by charger 37 so that the next electrostatic latent image can be written onto the page area. When the charged page area reaches the scanning position of the second optical scanning device 40, the second optical scanning device 40 projects light corresponding to magenta-color image information. Another electrostatic latent image is formed on the photoreceptor belt 14 by the second optical scanning device 40, and is developed by the second developing device 46, which supplies magenta developer (M).

This process repeats as the page area continues through the third and fourth optical scanning devices 50 and 60, projecting cyan-color and black image information, and through the third and fourth developing devices 56 and 66, supplying cyan-color developer (C) and black developer (BK). Consequently, by passing through all four developing devices, a full color image can be formed within the page area on the receptor belt 14.

The page area continues along the circulation path through the drying device 18, which removes liquid carrier from the photoreceptor belt 14.

The color image formed of developing material on the photoreceptor belt 14 is transferred to a transfer roller 21, which rotates in contact with the photoreceptor belt 14. The color image is transferred via the transfer roller 21 to a sheet of paper 23 entering between the transfer roller 21 and a fixing roller 22.

This printer is susceptible to color registration error. Color registration error occurs when the image of an individual color is not registered at the correct pixel writing position in relation to the color images of the other colors. This occurs as optical scanning devices 30, 40, 50 and 60 sequentially write their respective color image information onto the same page area on the circulating photoreceptor belt 14, when the respective color image information is inaccurately registered within the page area. As a result, the desired image cannot be obtained.

The conventional art corrects color registration error by printing an image of a predetermined test pattern, having an inspector measure the distance difference between adjacent test patterns of different colors output on the paper 23, calculating the amount of color registration error, and adjusting the printing process to compensate for the error. However, this method is complicated, since the inspector must manually calculate the color registration error. Manual inspection has a high possibility of introducing extraneous error and imprecision into the calculation of the color registration error amount.

In another conventional method, color registration is corrected by printing test patterns for each color using all of the developing devices 36, 46, 56 and 66 by a normal printing method, and calculating the amount of color registration error by detecting information associated with the interval between the printed test patterns of the different colors. Detection is performed by an image information acquisition sensor such as a charge-coupled device (CCD). However, this method requires the installation of image information acquisition sensors for the respective colors to accurately measure a color registration error, thus complicating the installation.

SUMMARY OF THE INVENTION

To solve the above problems, it is an objective of the present invention to provide a printer which can internally and accurately measure and correct a color registration error without adding a large number of components, and a method of correcting the color registration error.

Accordingly, to achieve the above objective, the present invention provides a printer including: a photoreceptor circulating along a path formed by a plurality of rollers; a plurality of optical scanning devices for emitting a scanning light toward the photoreceptor; a plurality of developing devices for supplying developing materials of different colors to the photoreceptor; a plurality of optical detectors for detecting part of the light emitted from the optical scanning devices; an engine controller for controlling a driving of the optical scanning devices, the developing devices, and the rollers, using received light output from the optical detectors so that test patterns for each optical scanning device set to detect a color registration error between the optical scanning devices is formed on the photoreceptor; a pattern position detector for detecting the positions of the test patterns formed from fixed positions through a developing process; and a color registration correction calculator for calculating a color registration error amount from the position information of the test patterns provided by the pattern position detector, and calculating color registration correction data from the calculated error amount and outputting the calculated correction data to the engine controller.

Preferably, the engine controller selects a single developing device to develop electrostatic latent images formed on the photoreceptor in response to the test patterns formed by the optical scanning devices, thereby using a single color developing material.

To achieve the above objective, the present invention provides a color registration error correcting method including the steps of: (a) forming electrostatic latent images corresponding to test patterns of different colors set for color registration error detection, on the photoreceptor by the optical scanning devices; (b) developing the different color electrostatic latent images with a single color developing material by one selected developing device; (c) detecting the positions of the test patterns formed of the single color developing material; (d) calculating color registration error amounts from the detected test pattern position information; and (e) obtaining color registration correction data from the error amounts calculated in step (d).

BRIEF DESCRIPTION OF THE DRAWINGS

The above objective and advantage of the present invention will become more apparent by describing in detail a preferred embodiment thereof with reference to the accompanying drawings, in which.

DETAILED DESCRIPTION OF THE PREFERRED EMBODIMENTS

Figure 1:
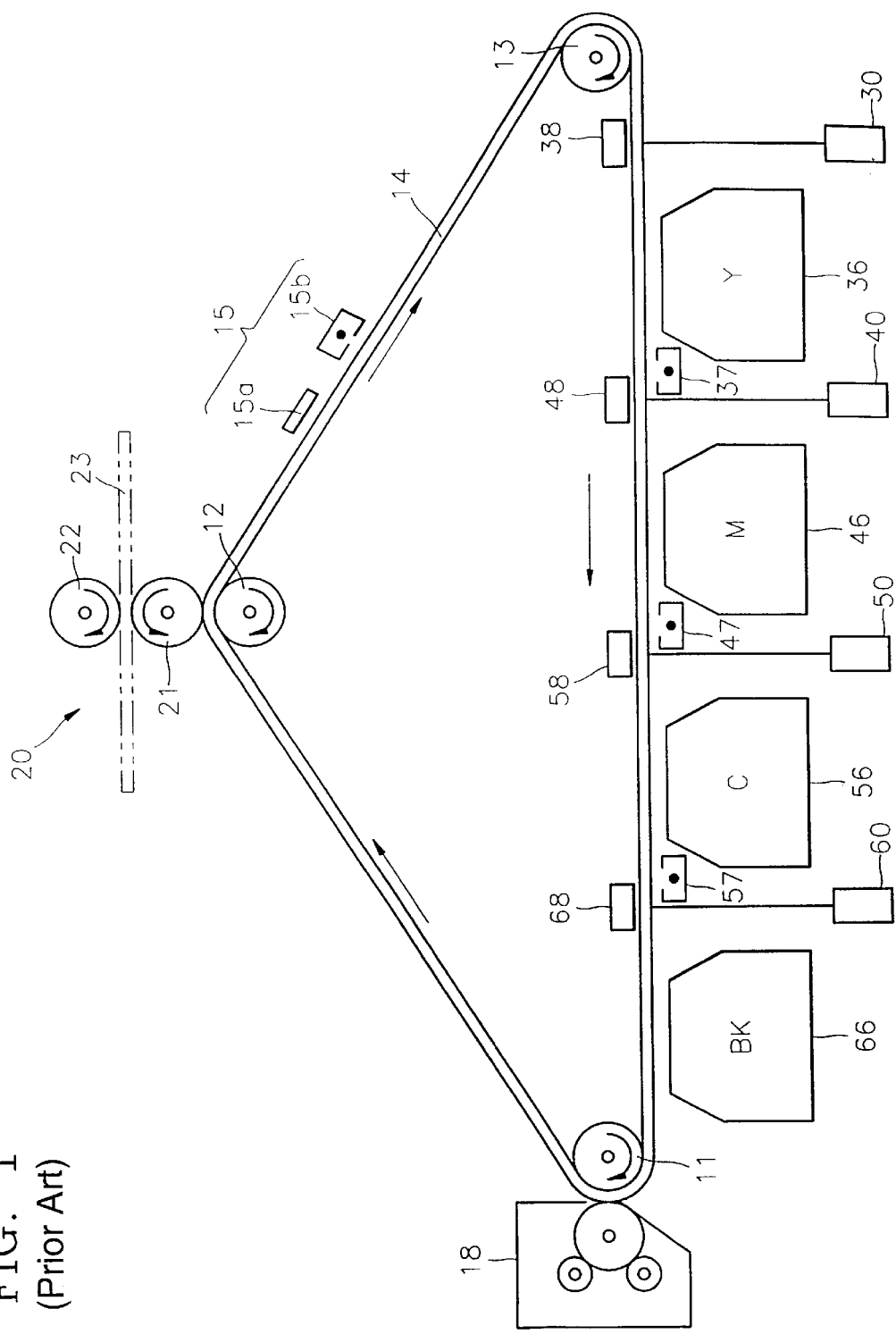
FIG. 1 is a cross-sectional view of the engine of a general liquid electrophotographic printer.
Figure 2:
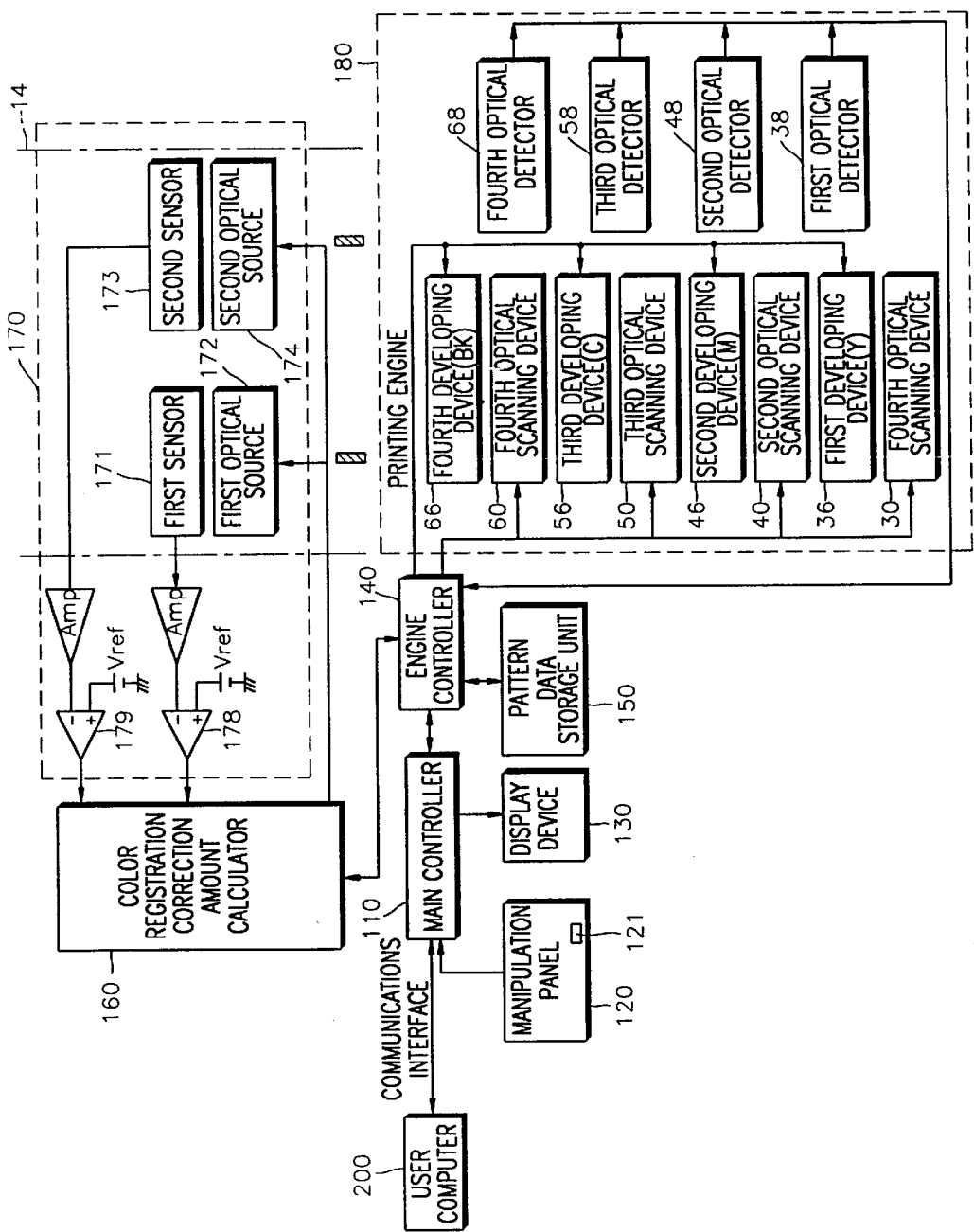
FIG. 2 is a block diagram of a printer according to the present invention.

FIG. 2 is a block diagram of a printer according to the present invention. The same reference numerals as those in FIG. 1 denote the same components.

Referring to FIG. 2, the printer includes a main controller 110, a manipulation panel 120, a display device 130, an engine controller 140, a pattern data storage unit 150, a color registration error correction amount calculator 160, a pattern position detection unit 170, and a printer engine 180.

The printing engine 180 has mechanical devices which are controlled by the engine controller 140 to print a desired image on paper.

Figure 3:
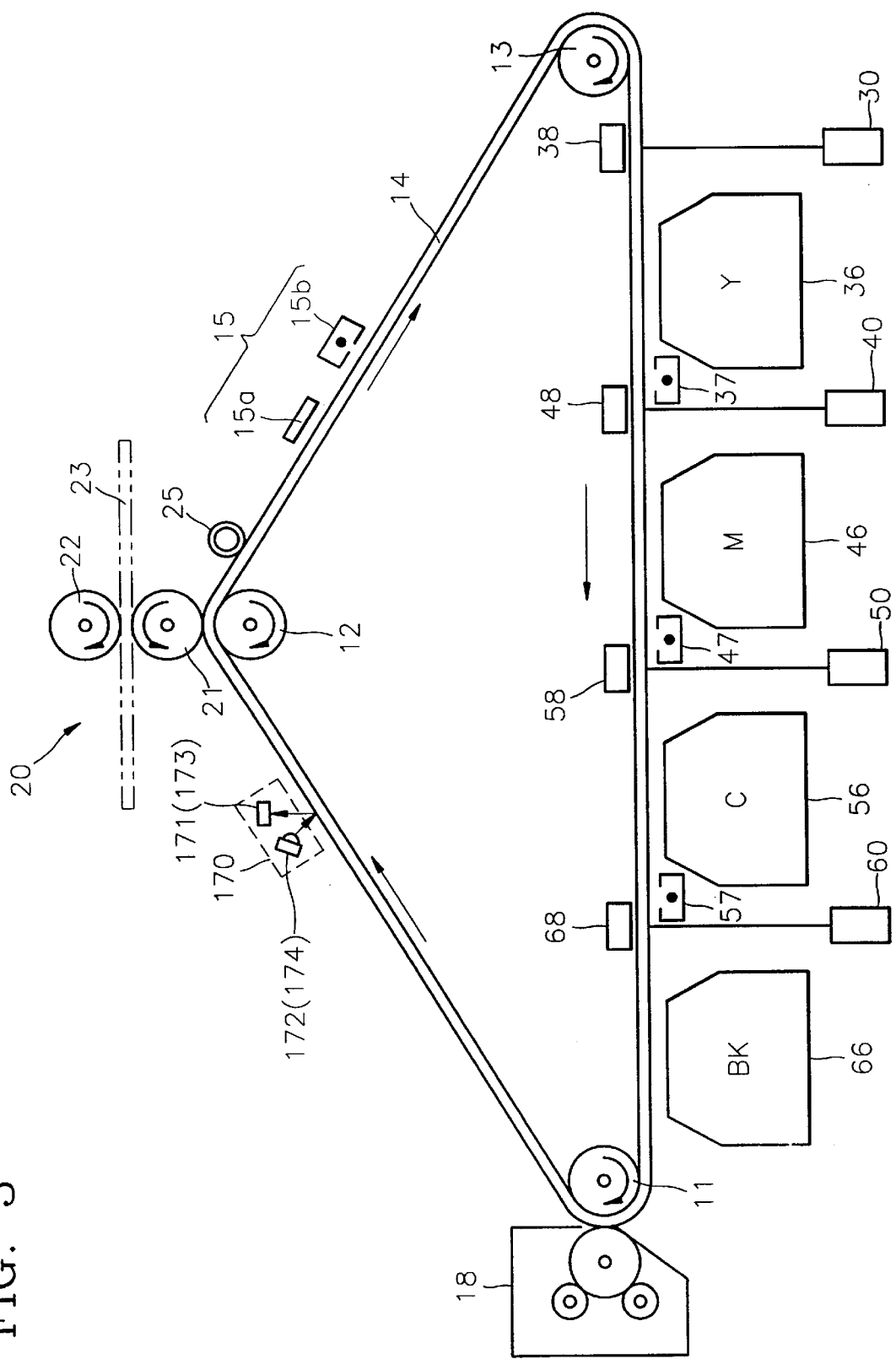
FIG. 3 is a cross-sectional view illustrating the arrangement relationship between the printing engine and the pattern position detection sensor unit of FIG. 2.
Figure 4:
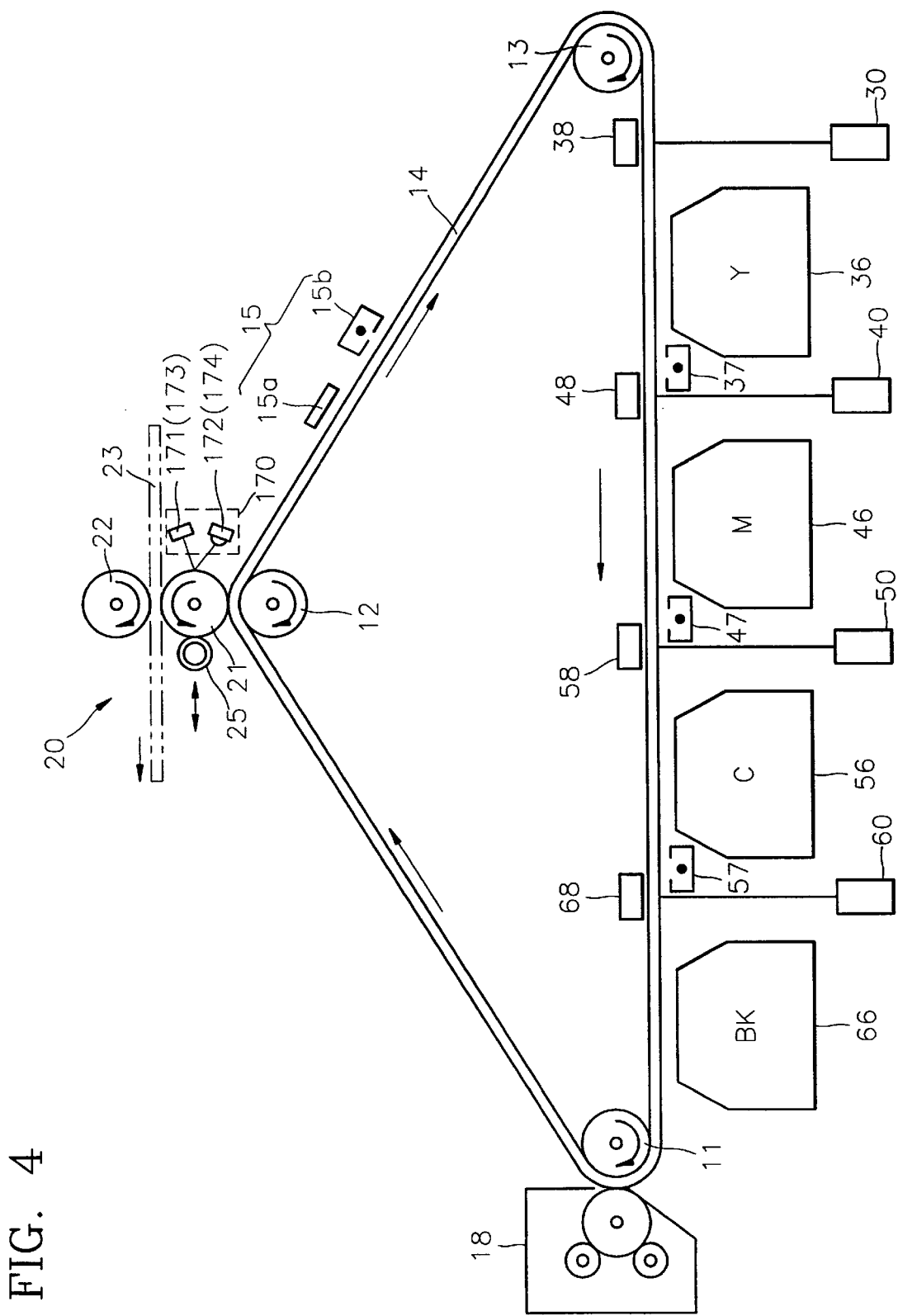
FIG. 4 is a cross-sectional view illustrating another arrangement relationship between the printing engine and the pattern position detection unit of a printer according to the present invention.

Referring to FIGS. 3 and 4 showing a liquid electrophotographic printer engine, the printer engine 180 includes a photoreceptor belt 14, a reset device 15, optical scanning devices 30, 40, 50 and 60, optical detectors 38, 48, 58 and 68, developing devices 36, 46, 56 and 66, a drying device 18, and a transfer device 20. The photoreceptor belt 14 circulates along a path formed by a plurality of rollers 11, 12 and 13. Reference numeral 25 is a cleaning device for cleaning test patterns off the photoreceptor belt 14.

The first through fourth optical scanning devices 30, 40, 50 and 60 are controlled by the engine controller 140, and project pieces of information associated with colors of yellow, magenta, cyan and black onto the photoreceptor belt 14, respectively.

The first through fourth developing devices 36, 46, 56 and 66 supply yellow, magenta, cyan and black developers Y, M, C and BK to the photoreceptor belt 14, respectively.

The main controller 110 decodes print data transmitted from a user computer 200 via a communications interface, converts the decoded data into a bitmap image data suitable for driving the printer engine 180, and transmits the resultant data to the engine controller 140. The main controller 110 processes a signal input from the manipulation panel 120, and controls the display device 130 to display information.

The manipulation panel 120 is provided with a plurality of keys with which the functions of the printer can be selected. Preferably, a diagnosis key 121 for commanding execution of a color registration error diagnosing mode is formed on the manipulation panel 120.

The engine controller 140 controls all operations of the printer engine 180, printing an image corresponding to the bitmap image data transmitted from the main controller 110, during normal printing operation. When the engine controller 140 is commanded by the main controller 110 to execute the color registration error diagnosing mode, as selected by the manipulation of the diagnosis key 121, it controls the printer engine 180 so that test patterns recorded in the pattern data storage unit 150 can be formed on the photoreceptor belt 4. When correction data associated with the results of the formation of the test patterns is output from the color registration correction amount calculator 160, the engine controller 140 corrects control timing data associated with the image formation, accomplished by the printer engine 180 using this correction data.

The pattern position detection unit 170 includes a first sensor 171, a first optical source 172, a second sensor 173, and a second optical source 174.

Each of the first and second sensors 171 and 173 photographs an image within its camera window view and outputs an electrical signal corresponding to the photographed image. A CCD can be applied as both the first and second sensors 171 and 173.

To increase the image pickup sensitivities of the first and second sensors 171 and 173, the first and second optical sources 172 and 174 are installed to project light toward the pickup-object positions of the first and second sensors 171 and 173. Preferably, the color registration correction amount calculator 160 controls the light emission amounts of the first and second optical sources 172 and 174 using signals output from the sensors 171 and 173. The light emission amounts of the first and second optical sources 172 and 174 are controlled so that voltage levels output from the sensors 171 and 173 in response to received light are constant with respect to portions on which an image is not formed.

The first and second sensors 171 and 173 and the first and second optical sources 172 and 174 can be installed at any position facing the transmission path for a completely-formed yet-to-be-printed image. The first and second sensors 171 and 173 and the first and second optical sources 172 and 174, for example, can be installed opposite to the photoreceptor belt 14 between the drying device 18 and the transfer device 20 as shown in FIG. 3, or can be installed opposite to the transfer roller 21 as shown in FIG. 4.

Figure 5:
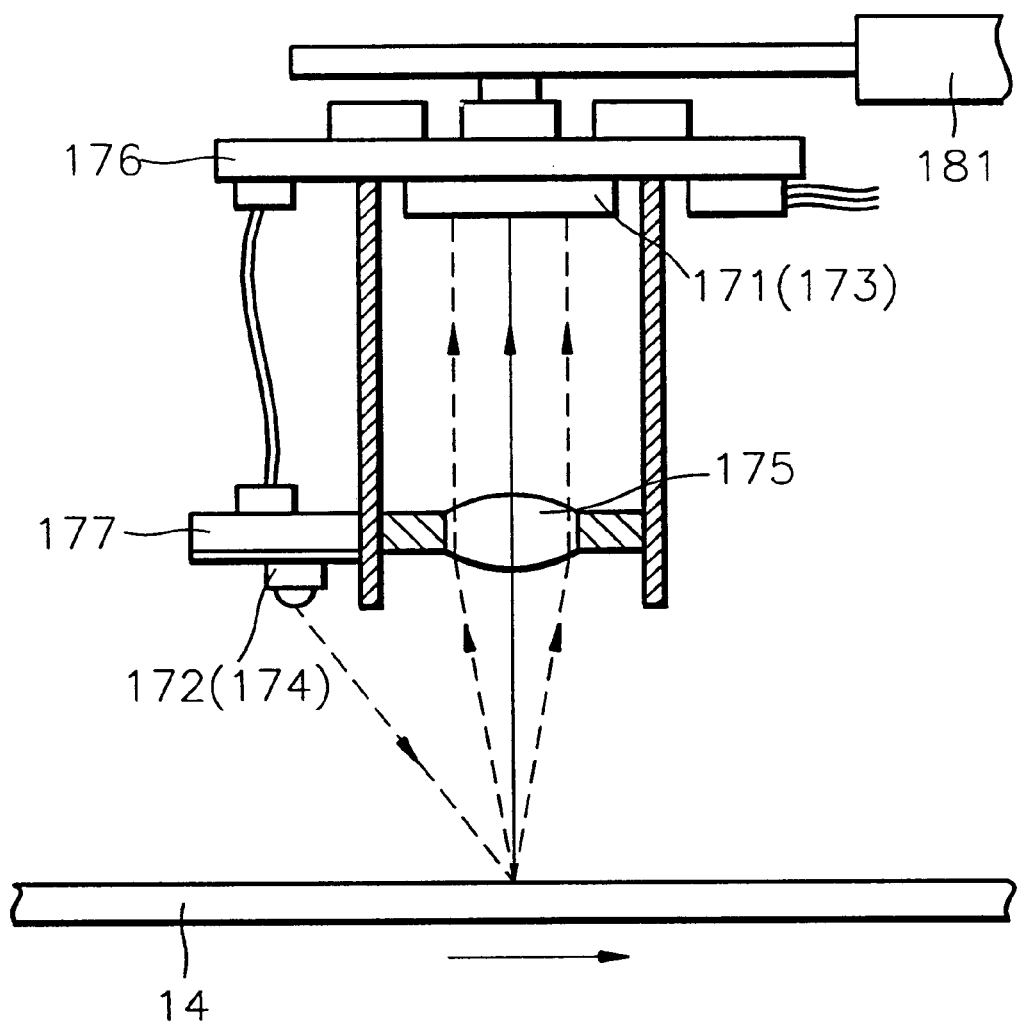
FIG. 5 is a cross-sectional view illustrating an example of the concrete configuration of the pattern position detection unit of FIG. 2.

Also, as shown in FIG. 5, it is preferable that a light focusing lens 175 for focusing light emitted from the pickup object areas on the sensors 171 and 173 is installed between the sensors 171 and 173 and the pickup object areas. Reference numeral 181 is a main structural frame, reference numeral 176 is a sensor board, and reference numeral 177 is an optical source supporting board.

Signals from the first and second sensors 171 and 173 in response to received light are output to the color registration correction amount calculator 160 via an amplifier (AMP) and comparators 178 and 179.

The color registration correction amount calculator 160, as a color registration correction means, receives color-registration test pattern data by being interfaced with the engine controller 140, and calculates the amount of color registration error by comparing the test pattern position information output from the first and second sensors 171 and 173 with the pattern data. Also, the color registration correction amount calculator 160 outputs correction data for correcting the calculated error amount to the engine controller 140.

Figure 6:
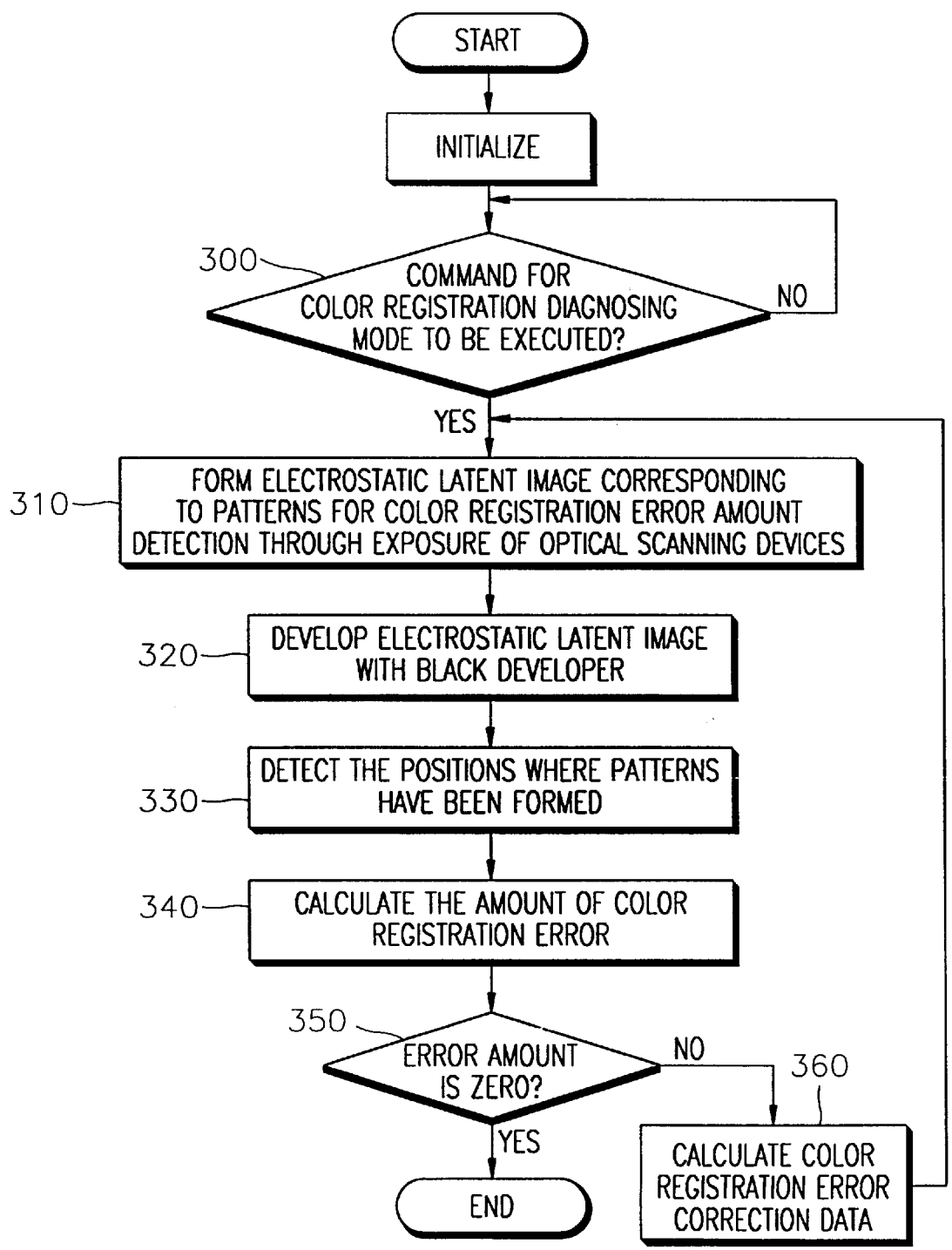
FIG. 6 is a flowchart illustrating a method of correcting a color registration error, according to the present invention.

The process for correcting a color registration error of a printer will now be described in more detail referring to FIG. 6.

First, a determination is made as to whether there is a command for a color registration diagnosing mode, in step 300. If it is determined in step 300 that there is a command for a color registration diagnosing mode, the test pattern data for each color set for color registration error detection is read from the pattern data storage unit 150, and the operations of the optical scanning devices 30, 40, 50 and 60 are controlled so that an electrostatic latent image corresponding to the read test pattern data is formed on the photoreceptor belt 14, in step 310.

The electrostatic latent image formed by the optical scanning devices 30, 40, 50 and 60 on the photoreceptor belt 14 is developed by a selected developing device, preferably, the fourth developing device 66 for supplying a black developer (BK), in step 320.

The position information between the test patterns formed on the photoreceptor belt 14 is detected by the first and second sensors 171 and 173, in step 330.

The color registration correction amount calculator 160 calculates the amount of color registration error corresponding to the difference between the position value of the test pattern data as ideally applied and as detected, in step 340.

When the calculated error amount is determined to be zero in step 350, the execution of the color registration diagnosis is concluded with the determination that no color registration error exists.

When it is determined in step 350 that there is any amount of error, suitable color registration error correction data is calculated and output to the engine controller 140, in step 360. The engine controller 140 corrects data related to printing engine control for image formation using the received correction data. Subsequent image formation accomplished by the printer engine 180 is based on the corrected engine control related data.

Preferably, the above-described process is repeated until the error amount is determined to be zero.

Figure 7:
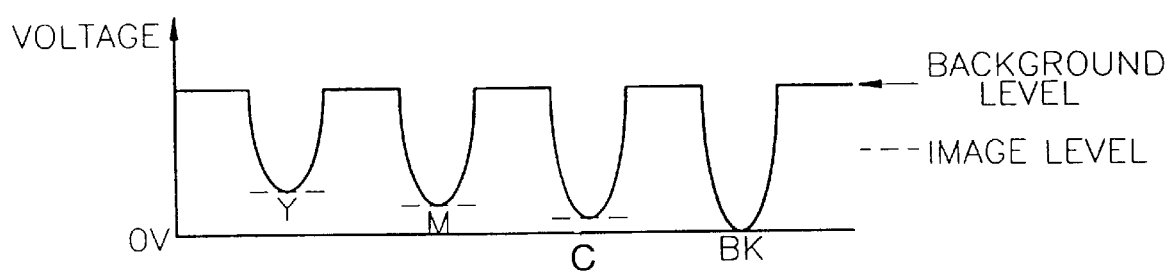
FIG. 7 is a graph showing the waveforms of sensor outputs corresponding to images of different colors when test pattern of different colors are developed with corresponding color developing materials.

In this color registration error correcting process, the electrostatic latent images, formed on the photoreceptor belt 14 in response to test pattern data projected by the optical scanning devices 30, 40, 50 and 60 used to project information for different colors, are developed with a single color, such as a black developer (BK). This process has the following advantage. When the electrostatic latent images formed by the optical scanning devices 30, 40, 50 and 60 are developed with developers of different colors, the output signals of the first and second sensors 171 and 173 vary according to the color of each test pattern on the basis of a background level, which corresponds to light incident from areas of the photoreceptor belt 14 on which no image is formed, as shown in FIG. 7. Such a result makes it difficult to accurately detect the positions of the test patterns of different colors, or requires a more complicated circuit to accomplish accurate position detection. However, when the test patterns are developed with a single color as in the present invention, accurate image detection determination can be made from the output signals of the first and second sensors 171 and 173, thereby simplifying the configuration of the detection circuit.

Figure 8:
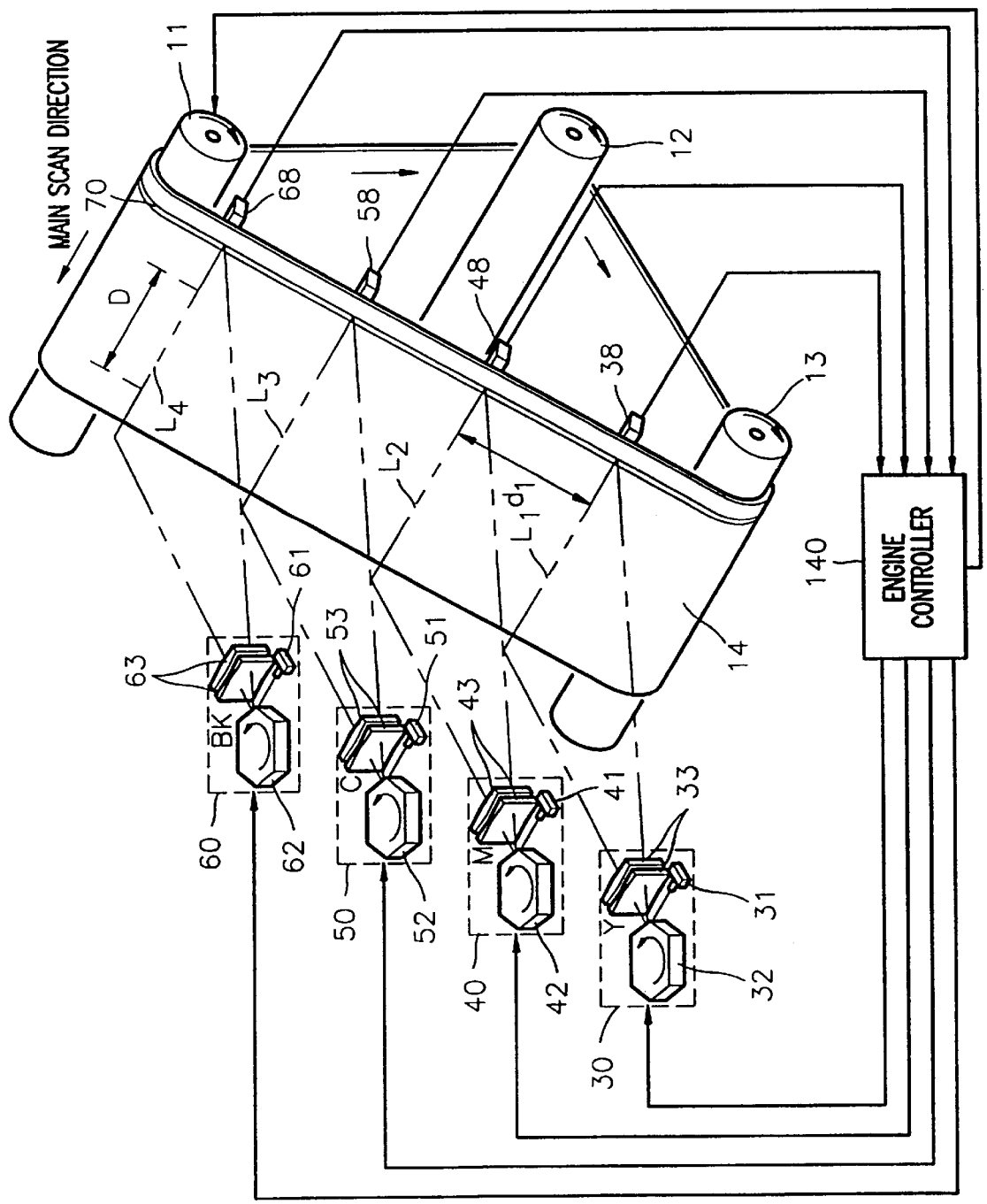
FIG. 8 is a perspective view of part of the printing engine of FIGS. 3 and 4 for illustrating the operation of the printing engine and the cause of a color registration error depending on the operation of the printing engine.

The color registration error correcting process is also seen in association with the operation of the printer engine 180 in FIG. 8. When the leading edge of a page area set on the photoreceptor belt 14 reaches the scanning line ($L_1$) of the first optical scanning device 30, a yellow-color image information scan for one line is initiated after a delay time determined in synchronization with a pulse signal output from the first optical detector 38 in response to reception of projected light. Here, the determined delay time corresponds to the time from the "drop point" of time of the pulse signal corresponding to the time the projected light reaches the edge of the transparent strip 70 of the photoreceptor belt 14, until a polygonal rotating mirror 32 rotating at constant speed, has a reflecting surface at an angle capable of reflecting light emitted from the optical source 31 toward the leading edge of a given image writing area (D). By shortening the determined delay, the margin area between the image writing area (D) and the transparent strip 70 can be used to write an electrostatic image. After the image information scan for one line, light emission is paused. When the next reflective facet of the rotating multi-faceted mirror 32 is situated to be capable of reflecting light, light is emitted until a pulse signal is output from the optical detector 38. After a pulse signal is output from the optical detector 38, light emission is paused during the determined delay time, and the image information for another line is then scanned.

The second optical scanning device 40 scans the image information for a magenta color by the same above-described driving method used for yellow. After the photoreceptor belt 14 moves a distance ($d_1$) from the scan line ($L_1$)

of the first optical scanning device 30, the page area set on the photoreceptor belt 14 arrives at the scan line ($L_2$) of the second optical scanning device 40. The third and fourth optical scanning devices 50 and 60 respectively scan images of cyan and black color information using the same driving method used for yellow and magenta, when the leading edge of the set page area reaches the scan lines $L_3$ and $L_4$ thereof.

FIG. 8 reference numerals 41, 51 and 61 are optical sources, reference numerals 42, 52 and 62 are rotating multi-faceted mirrors, and reference numerals 33, 43, 53 and 63 are lens units.

In this image formation method, errors occur when the image information, sequentially scanned for each color by the optical scanning devices 30, 40, 50 and 60, is inaccurately registered outside the confines of an intended pixel location within the designated page area set on the photoreceptor belt 14. In this case, a color registration error must be corrected.

Figure 9:
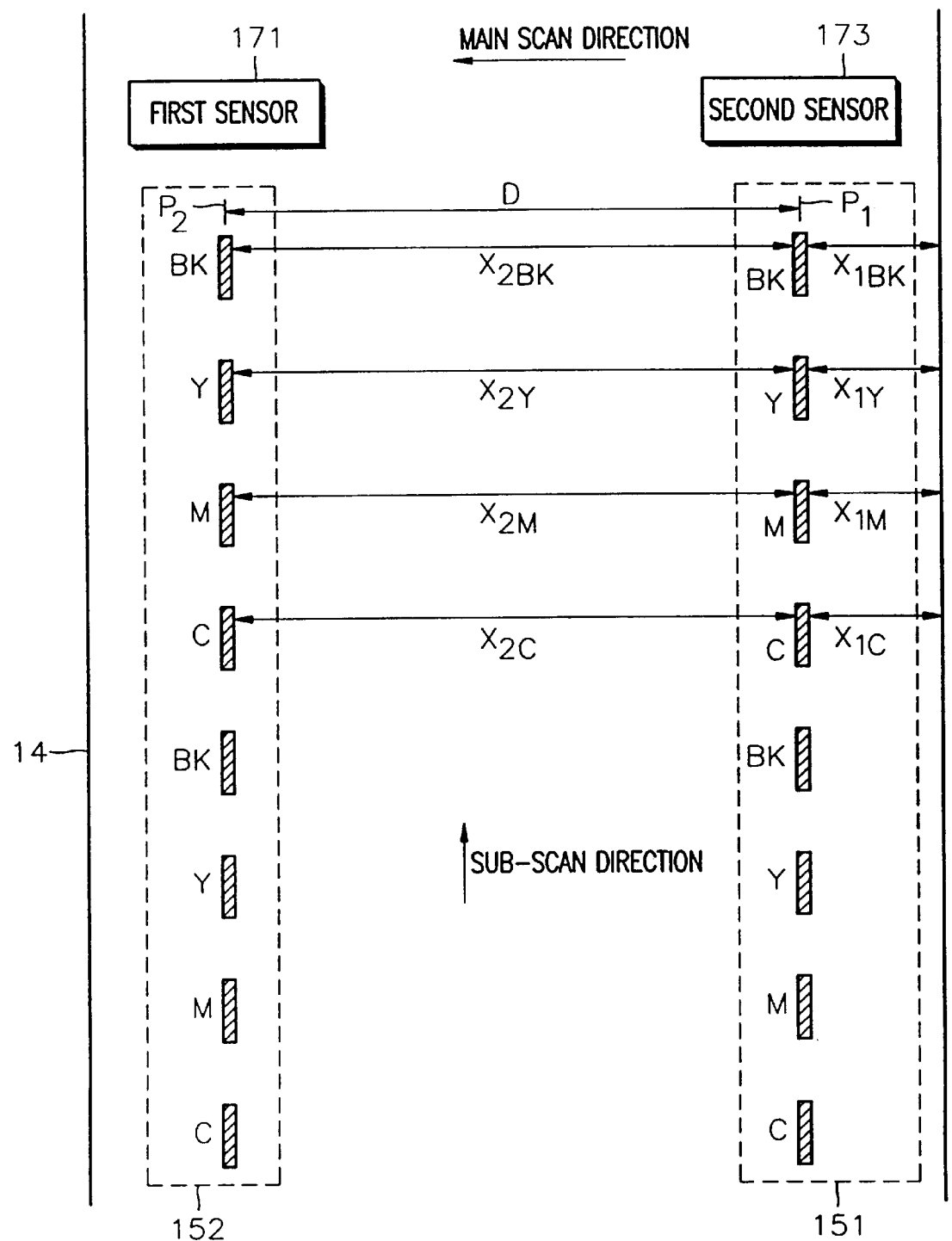
FIG. 9 is a block diagram of an example of a main scan directional color registration error detection test pattern which is applied to the present invention.

FIG. 9 shows an example of test patterns which are applied to correct a color registration error with respect to the main scan direction, which is the direction in which light is projected along the scan lines and perpendicular to the traveling direction of the photoreceptor belt 14. Reference characters BK, Y, M and C denote patterns formed by the fourth, first, second, and third optical scanning devices 60, 30, 40, and 50, respectively. All of these patterns are developed with the black developer of the fourth developing device 66. Test pattern data are aligned in strips at predetermined intervals in a sub-scan direction, parallel to the traveling direction of the photoreceptor belt, on main scan directional image writing start and close positions P1 and P2 on the image writing area D.

Figure 10A:
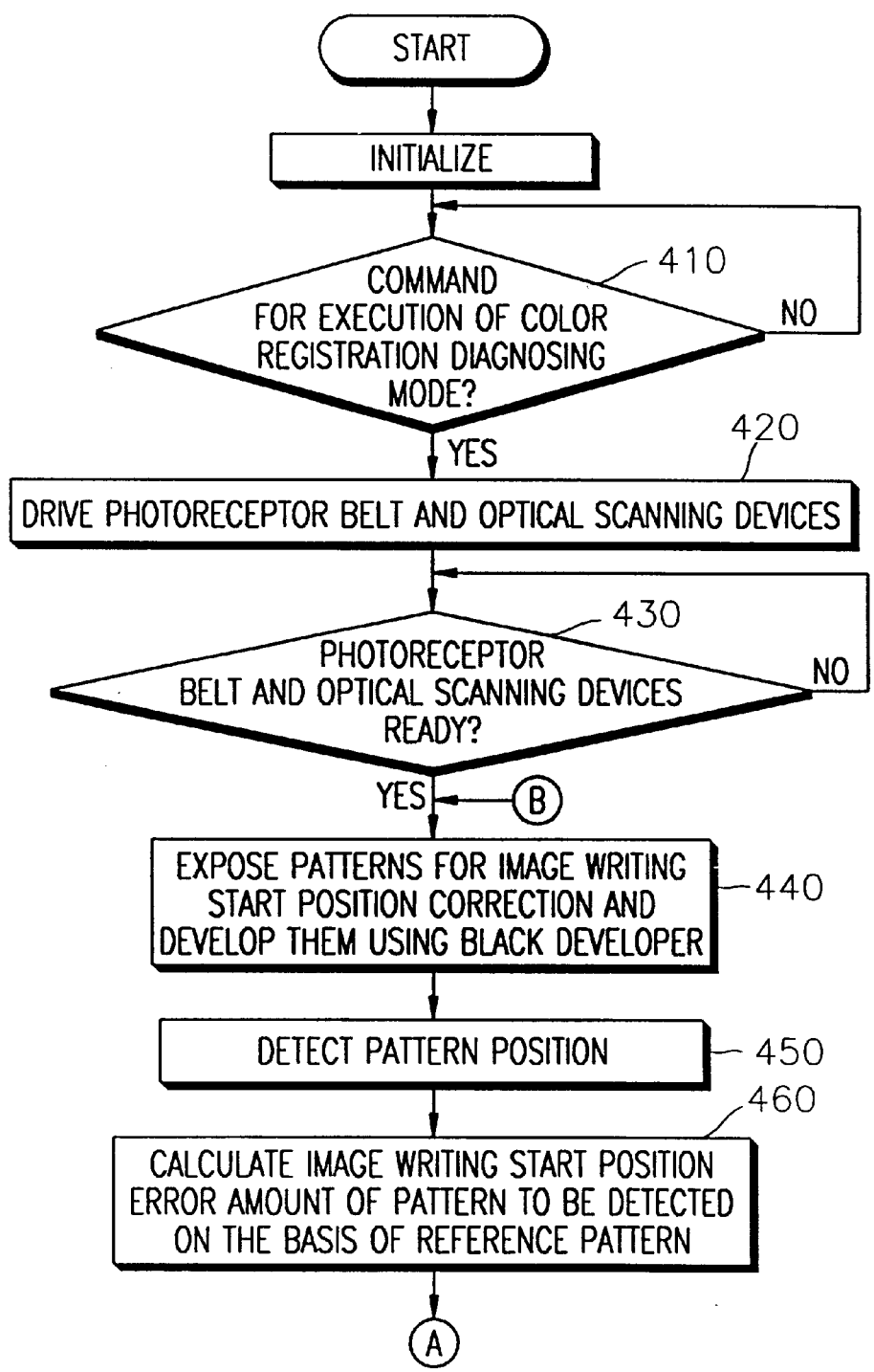
FIGS. 10A and 10B are flowcharts illustrating a process for correcting a main scan directional color registration error using the test pattern of FIG. 9.
Figure 10B:
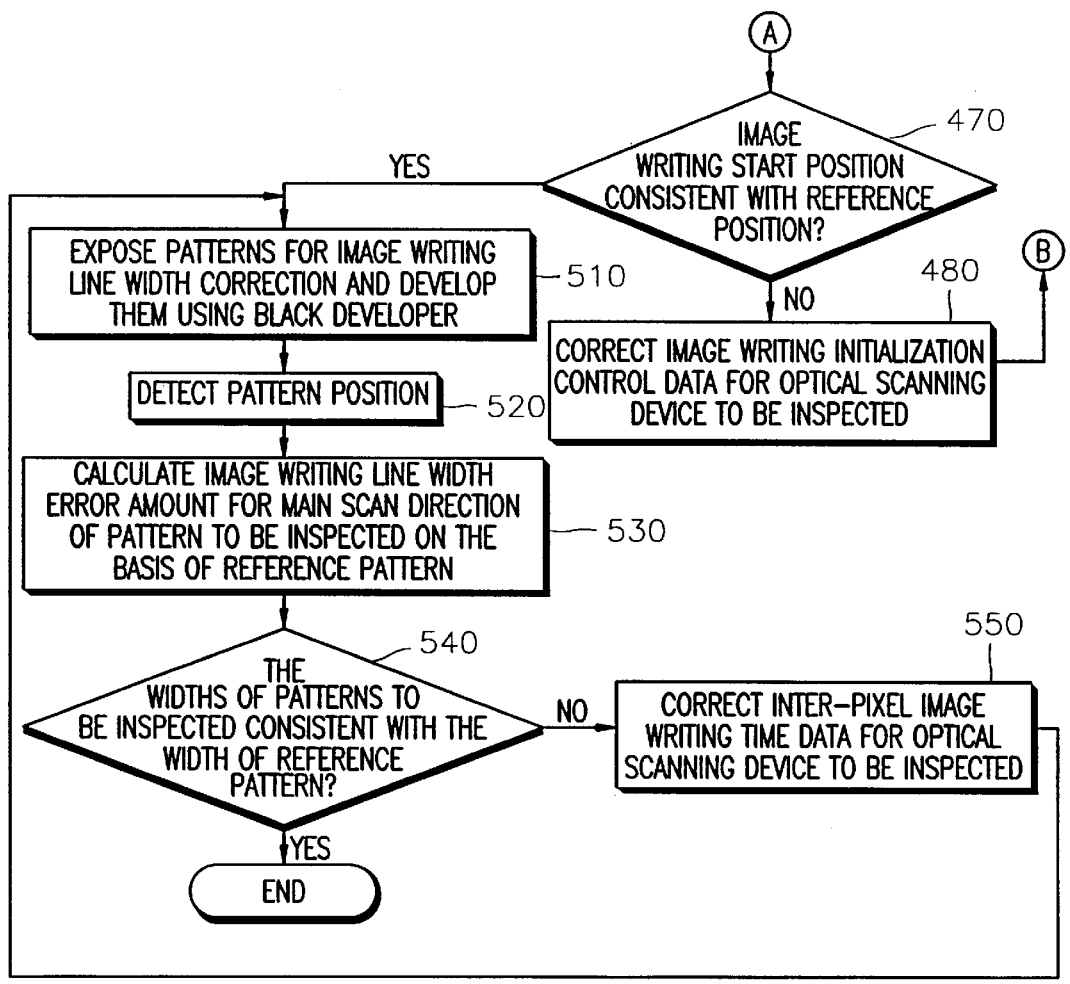

A process for correcting a main scan directional color registration error through this test pattern formation process will now be described referring to FIGS. 10A and 10B.

First, when it is determined in step 410 that there is a command for execution of a color registration diagnosing mode, the controllers driving the rotating multi-faceted mirrors 32, 42, 52 and 62 of optical scanning devices 30, 40, 50 and 60, and the rollers 11, 12 and 13, are reconfigured for registration diagnostics, in step 420. Here, it is preferable that the photoreceptor belt 14 rotates at a constant speed set lower than a speed set upon normal printing in order to increase the accuracy of measurement.

When it is determined in step 430 that the photoreceptor belt 14 and the rotating multi-faceted mirrors 32, 42, 52 and 62 are operating at the proper speed for registration diagnostics, the optical scanning devices 30, 40, 50 and 60 are driven to form electrostatic latent images corresponding to the test pattern data in a first pattern portion 151 in FIG. 9, using the output signals of the optical detectors 38, 48, 58 and 68 in response to light received thereby. That is, when the page area set on the photoreceptor belt 14 reaches the scan line ($L_1$), the first optical scanning device 30 projects light corresponding to test pattern data, registering an electrostatic image line, after a predetermined delay time corresponding to the time from the drop point signal from the optical detector 38, to the initiation of a main scan directional line image. The second through fourth optical scanning devices 40, 50 and 60 project light corresponding to test pattern data, using drop point signals from optical detectors 48, 58 and 68 for main scan direction timing, as the photoreceptor belt 14 positions the designated image line, formerly at $L_1$, at the respective scan lines $L_2$, $L_3$ and $L_4$.

Test pattern electrostatic latent images formed by the optical scanning devices 30, 40, 50 and 60 on the photoreceptor belt 14 are developed by the fourth developing device 66 in step 440.

The position information of these test patterns is detected by the second sensor 173 in step 450.

When the fourth optical scanning device 60 is selected as a reference optical scanning device, the color registration correction amount calculator 160 calculates the main scan directional error amounts of test patterns Y, M and C, as formed by the optical scanning devices 30, 40 and 50, on the basis of the position of a test pattern BK formed by the fourth optical scanning device 60, in step 460. That is, the error amounts of the distances $X_{1Y}$, $X_{1M}$ and $X_{1C}$ between the edge of the belt 14 and each of the patterns Y, M and C formed by the optical scanning devices 30, 40 and 50 are calculated on the basis of the distance $X_{1BK}$ between the edge of the belt 14 and the reference pattern BK. A determination of whether an image writing start position is consistent with a reference position is made on the basis of the calculated error amount, in step 470. If it is determined in step 470 that any amount of error exists, data related to image scan initiation is corrected, in step 480. Then, steps 440 through 470 are repeated.

If, however, it is determined in step 470 that no error exists, a second pattern portion 152 is formed on the photoreceptor belt 14, in step 510. In step 510, the corrected first pattern portion 151 can be formed on the photoreceptor belt 14 together with the second pattern portion 152 to be corrected.

Through steps 520 and 530, it is calculated how the line widths $X_{2Y}$, $X_{2M}$ and $X_{2C}$ of the patterns Y, M and C, formed by the optical scanning devices 30, 40 and 50, deviate from the image writing line width $X_{2BK}$ between the image writing start and close positions P1 and P2 of the reference pattern BK. Then, it is determined whether there is any amount of error, in step 540. If it is determined in step 540 that any amount of error exists, inter-pixel image scan time control data is corrected, instep 550. Thereafter, steps 510 through 540 are repeated.

As an alternative, after step 430, the first and second pattern portions 151 and 152 are formed together on the photoreceptor belt 14, and all of the image writing start position P1 and the image writing line widths are calculated and corrected.

Figure 11:
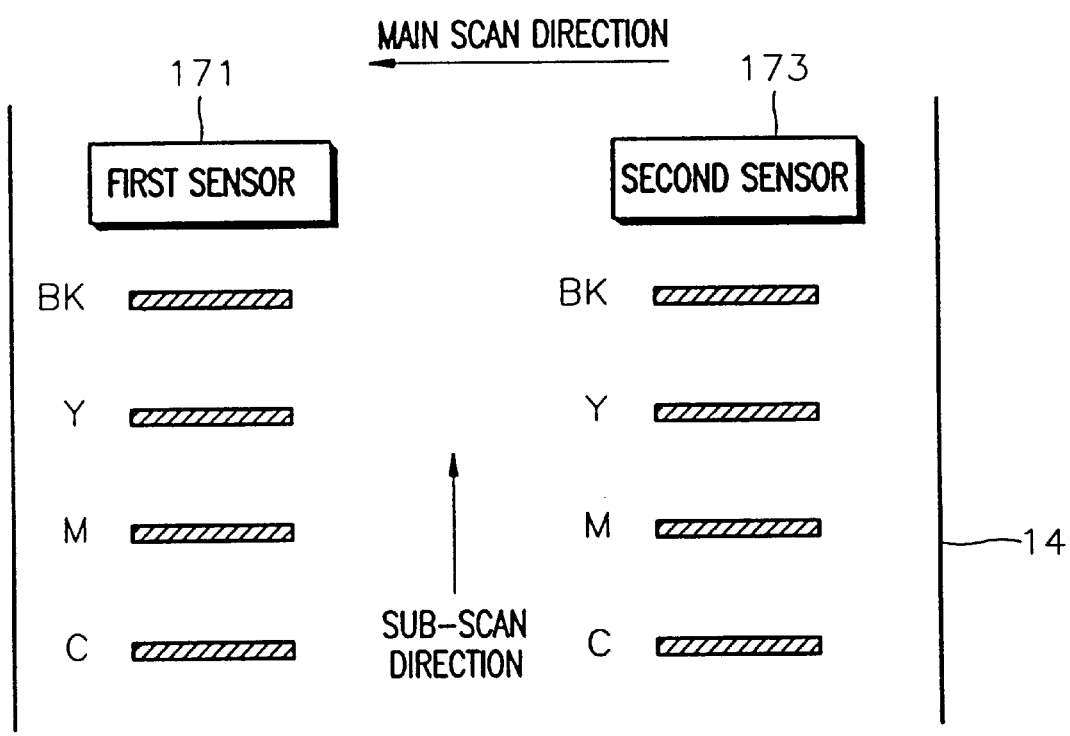
FIG. 11 is a block diagram of an example of a sub-scan directional color registration error detection test pattern which is applied to the present invention.

Additionally, color registration error with respect to a sub-scan direction (a direction perpendicular to the main scan direction) is corrected by calculating the error amount from the inter-pattern position information with respect to the sub-scan direction, using the output from sensors 171 and 173, and the test patterns shown in FIG. 11. In this case, the data for controlling the sub-scanning is corrected to make the distance between the test patterns consistent.

As an alternative, the test patterns of FIG. 9 and those of FIG. 11 can be formed together on the photoreceptor belt 14 through one printing process, in order to calculate the color registration errors with respect to both the main scan direction and the sub-scan direction.

Figure 12:
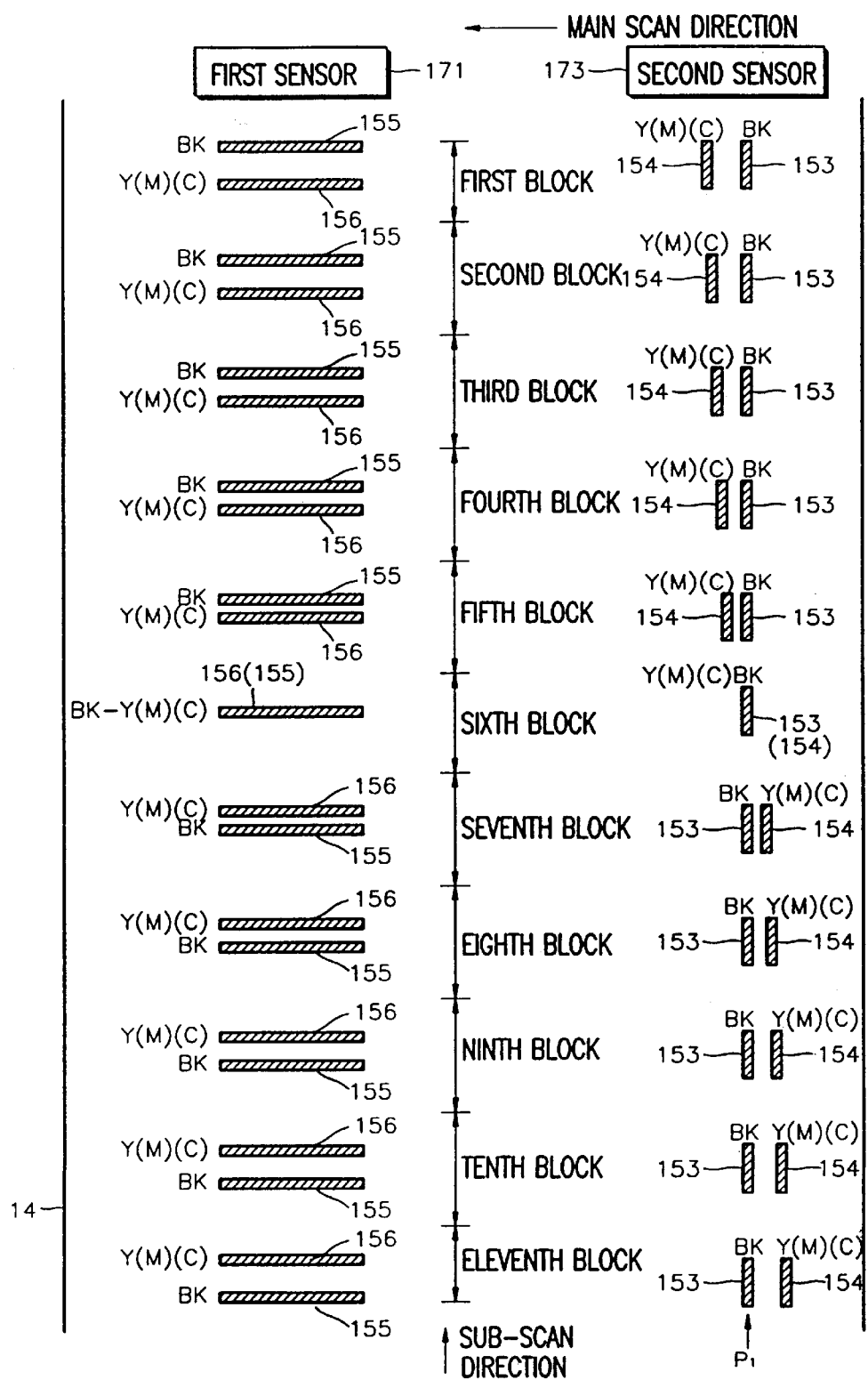
FIG. 12 is a block diagram of still another example of a color registration error detection test pattern which is applied to the present invention.

Another alternative test pattern and a color registration error correcting process using this test pattern are shown in FIGS. 12 and 13.

Referring to FIG. 12, first reference test patterns 153 are aligned at predetermined intervals along the sub-scan direction on the main scan directional image writing start position P1 corresponding to one edge of the image writing area D, where image writing area D is set in a middle portion of the photoreceptor belt 14. The first reference test patterns 153 are formed by the fourth optical scanning device 60 selected as a reference optical scanning device.

First position variable patterns 154 are formed by the optical scanning devices to be inspected: the first through third optical scanning devices 30, 40 and 50. First position variable patterns 154 are formed inside image writing area D, and also outside the image writing area D, toward the transparent strip 70 of the photoreceptor belt 14, at positions where a main scan directional error amount gradually increases and decreases from negative to positive by unit values set along the sub-scan direction on the basis of where the first reference test patterns 153 are formed on P1.

According to the example shown in FIG. 12, the main scan directional error component of the first position variable pattern 154 on the sixth block is set to be zero with respect to the first reference test pattern 153. The test patterns 153 and 154 are formed so that the error amounts of the variable test patterns 154 can gradually vary as it moves farther from the sixth block.

Accordingly, if only the block on which the first reference test pattern 153 is formed on the same position as the position of the first position variable pattern 154 is detected from the position information of the test patterns subsequently detected by the second sensor 173, image scan initiation time control data with respect to the main scan direction for the optical scanning devices 30, 40 and 50 can be corrected. Second reference test patterns 155, formed by the reference optical scanning device 60 selected to correct a sub-scan directional color registration error, are horizontally formed predetermined intervals apart from each other along the sub-scan direction of the photoreceptor belt 14. Second position variable patterns 156 formed by the optical scanning devices 30, 40 and 50 to be inspected are formed one by one along the sub-scan direction on positions where a sub-scan directional error amount gradually increases or decreases from negative to positive by set unit values on the basis of where the second reference test patterns 155 are formed. Then, the block on which the two patterns 155 and 156 are formed on the same position is detected by the above-described method, and control data for sub-scan directional image scan initiation time of the optical scanning devices 30, 40 and 50 can thus be compensated by an error amount applied to the detected block.

When using the test patterns of FIG. 12, it is preferable to calculate the color registration error amount of the optical scanning devices 30, 40 and 50 one-at-a-time, each optical scanning device diagnostic requiring an exclusive printing process.

Figure 13A:
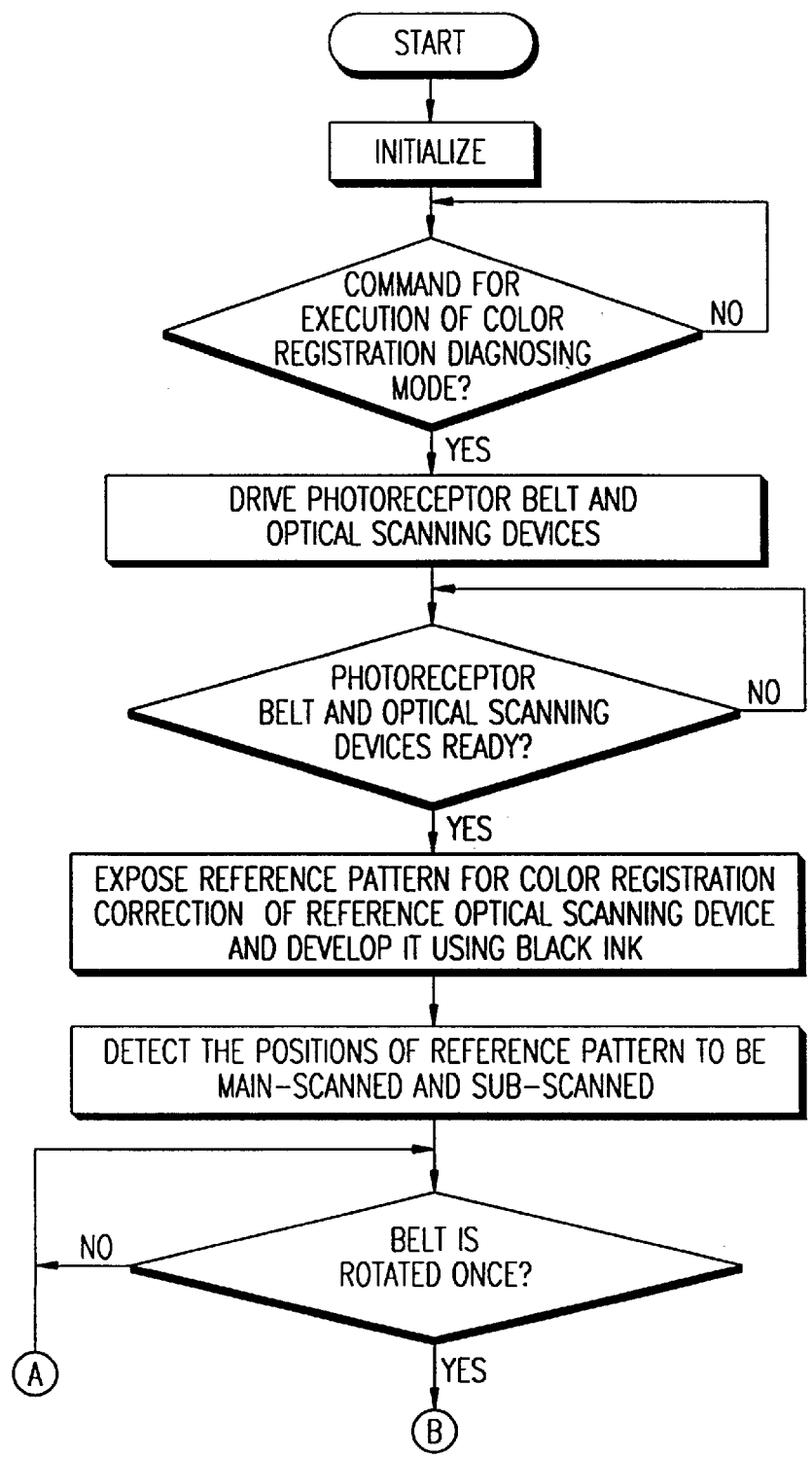
FIGS. 13A and 13B are flowcharts illustrating a process for correcting a color registration error using the test pattern of FIG. 12.
Figure 13B:
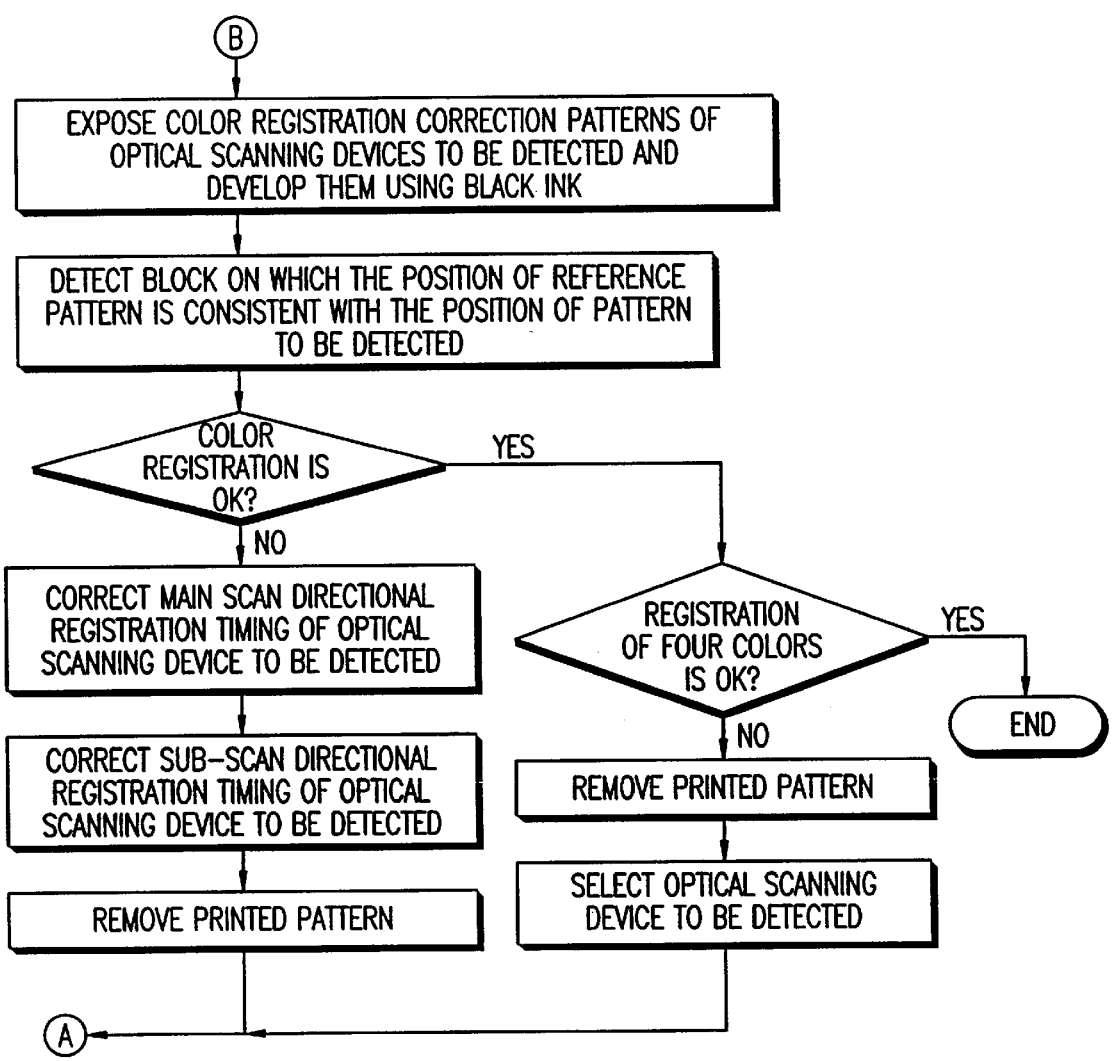

FIGS. 13A and 13B illustrate a process for correcting the color registration error of each of the optical scanning devices 30, 40 and 50 on the basis of the reference optical scanning device 60.

Figure 14:
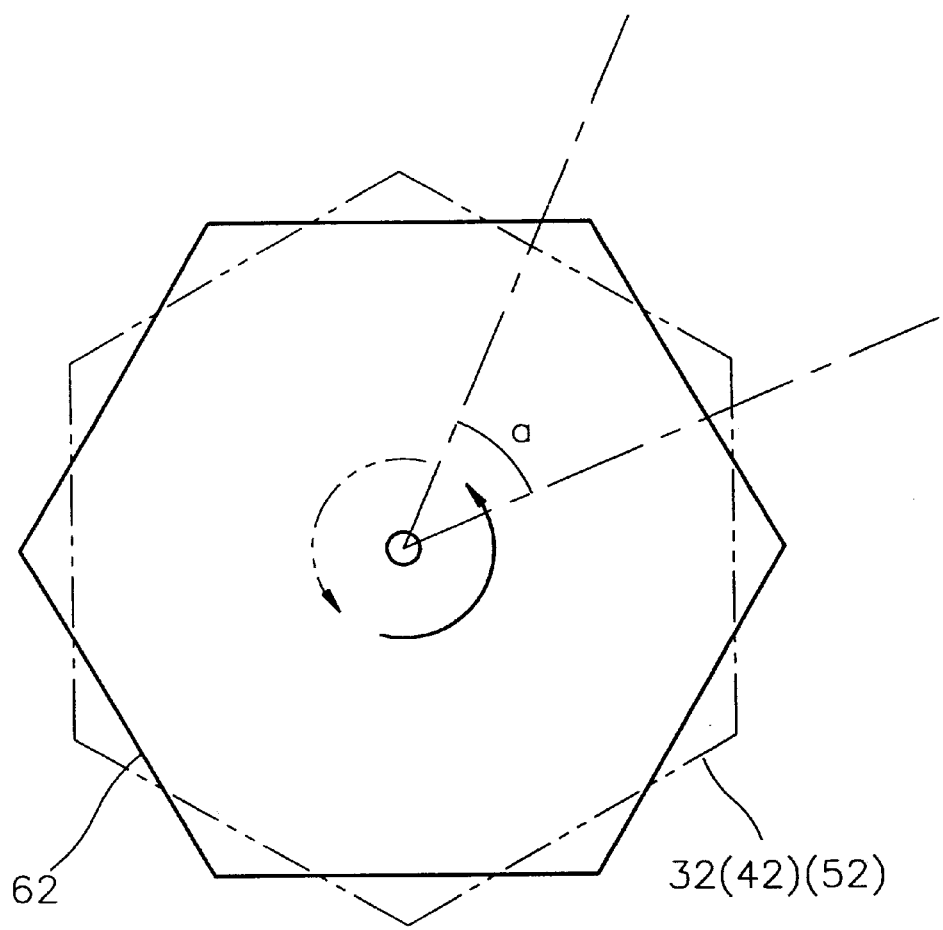
FIG. 14 is a plan view showing the alignment of polygonal rotating mirrors which rotate at normal speed within optical scanners, to illustrate a process for correcting a generated sub-scan directional color registration error.

The main scan directional color registration error correction among the optical scanning devices 30, 40, 50 and 60 is accomplished by internally correcting each scanning device's delay time. The delay times are from generation of a pulse signal from each of the optical detectors 38, 48, 58 and 68 in response to received light to image information scan initiation, and the scan interval for each pixel data so that the same number of pieces of pixel information can be registered on set positions within a set image line width. On the contrary, sub-scan directional color registration error correction between optical scanning devices 30, 40, 50 and 60 is accomplished by alignment adjustment between rotating multi-faceted mirrors 32, 42, 52 and 62 or scan disks (not shown: on which hologram patterns are formed to deflect incident light by rotation) applied as optical deflecting means of the applied optical scanning devices 30, 40, 50 and 60. That is, as shown in FIG. 14, an alignment angle (a) corresponding to the stagger degree between the reflective facet of the rotating multi-faceted mirror 62 of the reference optical scanning device 60 and that of each of the rotating multi-faceted mirrors 32, 42 and 52 of the optical scanning devices 30, 40 and 50 having a sub-scan directional registration error must be controlled. This alignment control data is obtained from the color registration correction amount calculator 160 according to the calculated sub-scan directional error amount. The engine controller 140 drives the rotating multi-faceted mirrors 32, 42, 52 and 62 at equal speeds according to the correction amount so that the reflective facet of the reference rotating multi-faceted mirror 62 and those of the remaining rotating multi-faceted mirrors 32, 42 and 52 can maintain an intersecting angle corresponding to the correction amount. At this time, color registration error is corrected.

As described above, according to the printer according to the present invention and the method of correcting a color registration error, an image is formed by developing electrostatic latent images corresponding to test patterns formed on a photoreceptor belt by optical scanning devices with a single color. Therefore, a structure for measuring error amounts from the test patterns is simple, and the accuracy of measurement can be improved.

It is contemplated that numerous modifications may be made to the printer and method of correcting color registration error thereof of the present invention without departing from the spirit and scope of the invention as defined in the following claims.

What is claimed is:

1. A printer comprising:

a photoreceptor circulating along a path formed by a plurality of rollers;

a plurality of optical scanning devices for emitting a scanning light toward the photoreceptor;

a plurality of developing devices for supplying developing materials of different colors to the photoreceptor;

a plurality of optical detectors for detecting part of the light emitted from the optical scanning devices;

an engine controller for controlling a driving of the optical scanning devices, the developing devices, and the rollers using received light output from the optical detectors so that test patterns for each optical scanning device set to detect a color registration error between the optical scanning devices is formed on the photoreceptor;

a pattern position detection means for detecting the positions of the test patterns formed from fixed positions through a developing process; and a color registration correction means for calculating a color registration error amount from the position information of the test patterns provided by the pattern position detection means, and calculating color registration correction data from the calculated error amount and outputting the calculated correction data to the engine controller, wherein the engine controller controls one selected developing device to develop electrostatic latent images formed on the photoreceptor in response to the test patterns by the optical scanning, devices with a single color developing material.

2. The printer of claim 1, wherein the pattern position detection means comprises:

first and second pattern position detection sensors spaced apart from each other opposite to an image writing surface of the photoreceptor; and first and second optical sources for irradiating light toward the detecting areas of the first and second pattern position detection sensors.

3. The printer of claim 1, wherein the pattern position detection means comprises:
   first and second pattern position detection sensors spaced apart from each other opposite to a transfer device for transferring an image formed on the photoreceptor to paper; and
   first and second optical sources for irradiating light toward the detecting areas of the first and second pattern position detection sensors.

4. The printer of claim 1, wherein a cleaning device for cleaning the completely-developed test patterns is installed at a predetermined position on an image transmission path.

5. A color registration error correcting method in a printer having a photoreceptor circulating along a path formed by a plurality of rollers, a plurality of optical scanning devices for scanning light toward the photoreceptor, and a plurality of developing devices for supplying developing materials of different colors to the photoreceptor, the method comprising the steps of:
   (a) forming electrostatic latent images corresponding to test patterns of different colors, set on the photoreceptor for color registration error detection by the optical scanning devices;
   (b) developing the different color electrostatic latent images with a single color developing material by one selected developing device;
   (c) detecting the positions of the test patterns formed of the single color developing material;
   (d) calculating color registration error amounts from the detected test pattern position information; and
   (e) obtaining color registration correction data from the color registration error amounts calculated in step (d).

6. The method of claim 5, further comprising:
   (f) repetition of steps (a) through (d) using the correction data obtained in step (e).

7. The method of claim 5, wherein step (a) further comprises:
   (a1) aligning the electrostatic latent images, corresponding to the test patterns, on an image writing start position and an image writing close position, corresponding to both edges of an image writing area set in a middle portion of the photoreceptor, and
   (a2) forming the images corresponding to said test patterns at predetermined intervals apart from each other along the circulating path of the photoreceptor.

8. The method of claim 5, wherein said test patterns comprise:
   first reference test patterns, spaced apart from each other at predetermined intervals along a sub-scan direction, aligned on a main scan directional image writing start position corresponding to one edge of the image writing area set in a middle portion of the photoreceptor, and formed by a reference optical scanning device selected from the plurality of optical scanning devices; and
   first position variable patterns, formed by optical scanning devices except for the reference optical scanning device so that main scan directional error amounts gradually vary along the sub-scan direction on the basis of the formation positions of the first reference test patterns.

9. The method of claim 5, wherein the test patterns comprise:
   second reference test patterns horizontally formed at predetermined intervals apart from each other along the sub-scan direction of the photoreceptor by the reference optical scanning device; and
   second position variable patterns formed by optical scanning devices except for the reference optical scanning device so that sub-scan directional error amounts gradually vary along the sub-scan direction on the basis of the formation positions of the second reference test patterns.

10. The method of claim 5, wherein during the steps (a) through (d), for calculating a color registration error amount, the photoreceptor is moved slower than a speed set upon normal printing.

11. A printer comprising:
   a photoreceptor circulating along a path formed by a plurality of rollers;
   a plurality of optical scanning devices which emit a scanning light toward the photoreceptor;
   a plurality of developing devices which supply developing materials of different colors to the photoreceptor;
   a plurality of optical detectors which detect part of the light emitted from the optical scanning devices;
   an engine controller which controls a driving of the optical scanning devices, the developing devices, and the rollers using received light output from the optical detectors so that test patterns for each optical scanning device set to detect a color registration error between the optical scanning devices is formed on the photoreceptor;
   a pattern position detector which detects the positions of the test patterns formed from fixed positions through a developing process; and
   a color registration correction calculator which calculates a color registration error amount from the position information of the test patterns provided by the pattern position detector, and calculates color registration correction data from the calculated error amount and outputting the calculated correction data to the engine controller,
   wherein the engine controller controls one selected developing device to develop electrostatic latent images formed on the photoreceptor in response to the test patterns by the optical scanning devices with a single color developing material.

12. The printer of claim 11, wherein the pattern position detector comprises:
   first and second pattern position detection sensors spaced apart from each other opposite to an image writing surface of the photoreceptor; and
   first and second optical sources for irradiating light toward the detecting areas of the first and second pattern position detection sensors.

13. The printer of claim 11, wherein the pattern position detector comprises:
   first and second pattern position detection sensors spaced apart from each other opposite to a transfer device for transferring an image formed on the photoreceptor to paper; and
   first and second optical sources for irradiating light toward the detecting areas of the first and second pattern position detection sensors.

14. The printer of claim 11, wherein a cleaning device for cleaning the completely-developed test patterns is installed at a predetermined position on an image transmission path.

* * * * *